Patented Apr. 15, 1924.

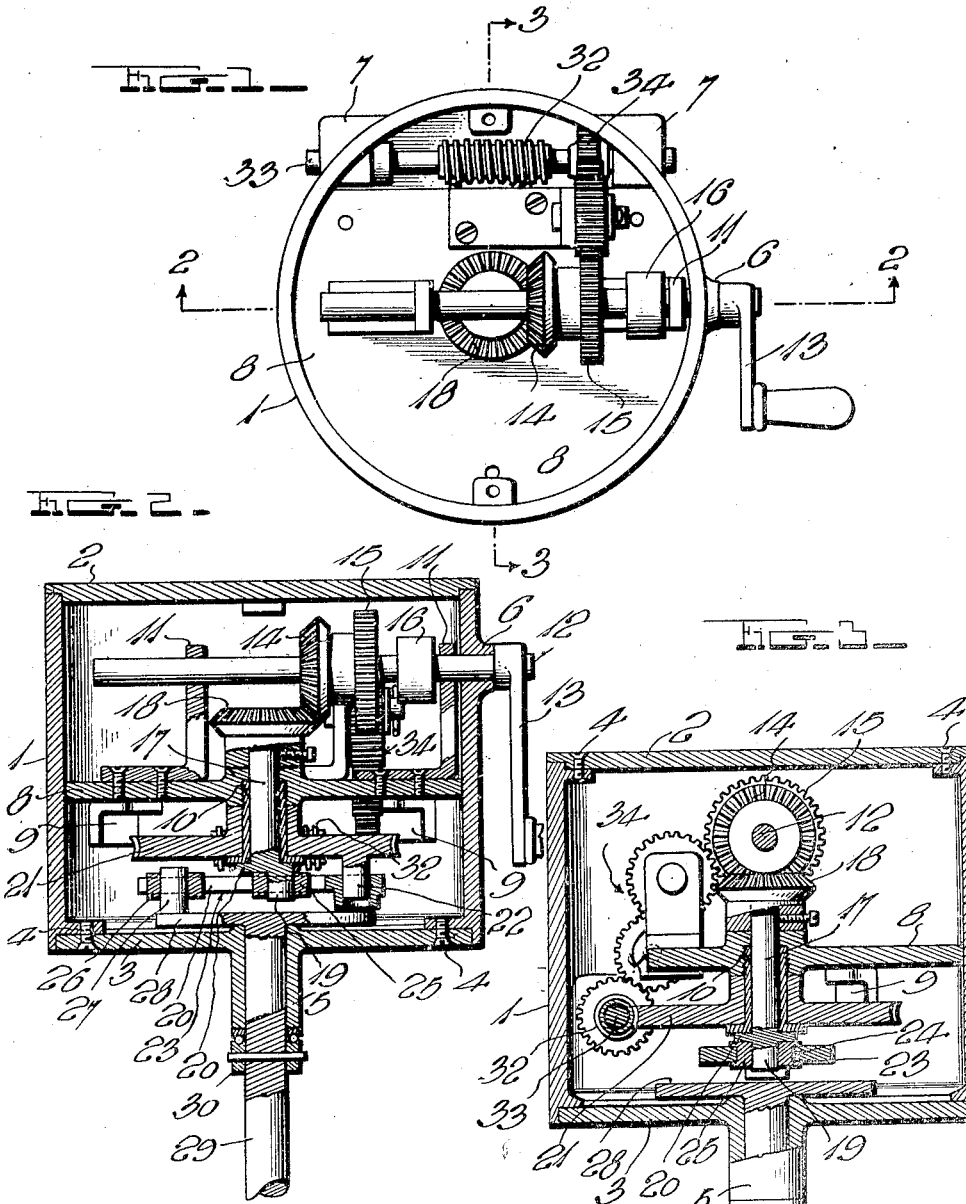

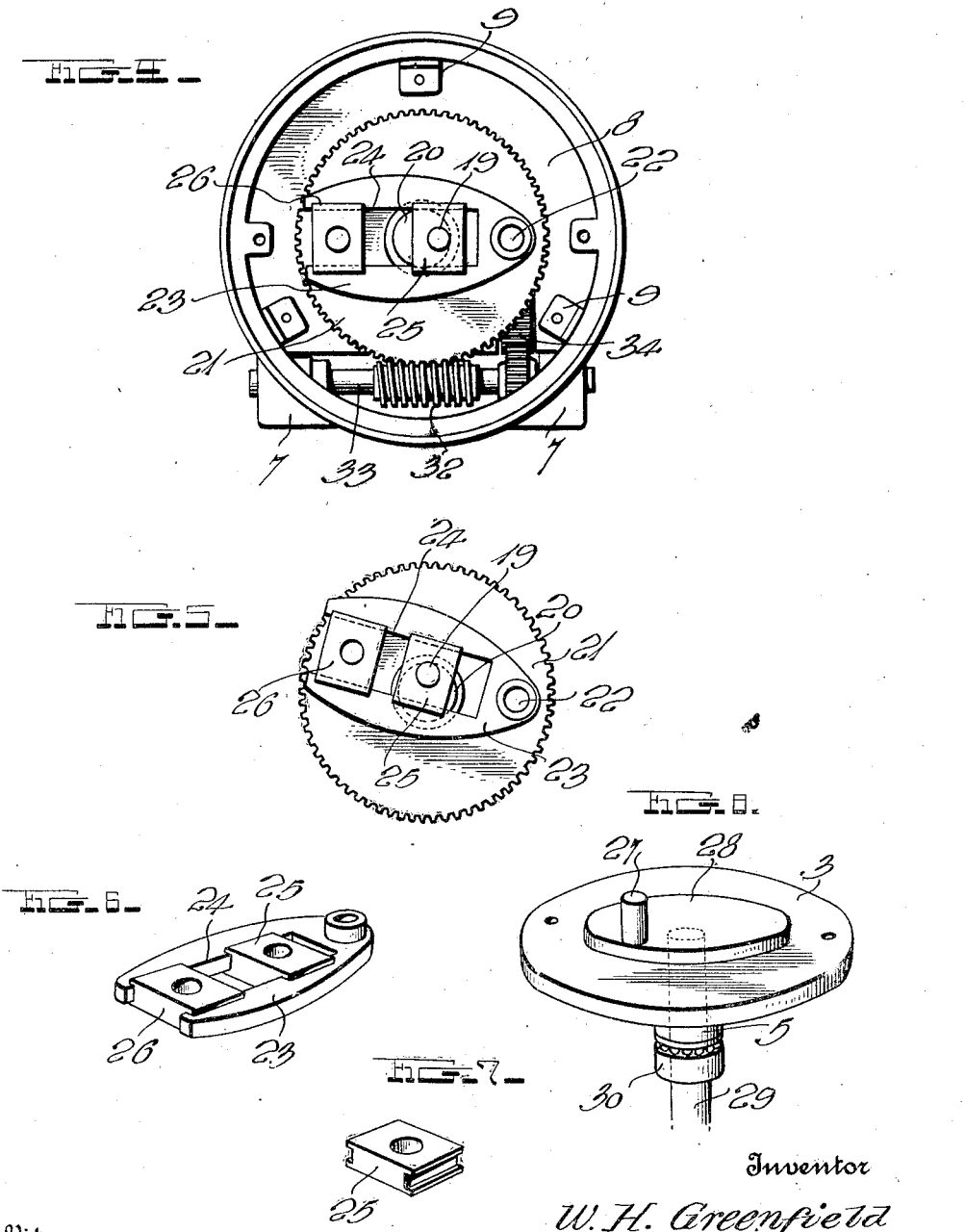

1,490,819

UNITED STATES PATENT OFFICE.

WILLIAM H. GREENFIELD, OF SEATTLE, WASHINGTON.

VALVE GRINDER.

Application filed June 21, 1923. Serial No. 646,901.

*To all whom it may concern:*

Be it known that I, WILLIAM H. GREENFIELD, a citizen of the United States, residing at Seattle, in the county of King and State of Washington, have invented certain new and useful Improvements in Valve Grinders; and I do declare the following to be a full, clear, and exact description of the invention, such as will enable others skilled in the art to which it appertains to make and use the same.

My invention relates to improvements in valve grinding devices for internal combustion engines and the principal object is to provide an exceptionally simple, yet an effective association of parts for producing the desired oscillation of the valve, while at the same time gradually advancing the same around its seat, thus producing the best results.

With the foregoing in view, the invention resides in the novel subject matter hereinafter described and claimed, the description being supplemented by the accompanying drawings.

Figure 1 is an upper end elevation with the cover plate of the casing removed.

Figure 2 is a central vertical sectional view partly in elevation, as indicated by line 2—2 of Fig. 1.

Figure 3 is a view similar to Fig. 2 but cut in a different plane, as indicated by line 3—3 of Fig. 1.

Figure 4 is a lower end elevation with the lower end of the casing and the valve turning shaft removed.

Figure 5 is a bottom plan view of the valve oscillating lever and associated parts.

Figure 6 is a perspective view of the valve oscillating lever and ap air of wrist pin shoes slidably carried thereby.

Figure 7 is a perspective view of one of the wrist pin shoes.

Figure 8 is a perspective view of the lower end plate of the casing and associated parts.

The form of my invention selected for illustration in the present application, is hand-operated, but it is to be understood that by making minor changes, any desired power can be used for driving the several parts.

The numeral 1 on the drawings designates a casing which is preferably of cylindrical form with its axis disposed vertically, said casing being provided with an upper end 2 and a lower end 3, both of which are preferably secured in place detachably by screws or the like 4. The end 3 is provided with a central vertical bearing 5, one end of the cylindrical casing wall is formed with a lateral bearing 6, and said wall is also provided with a pair of horizontally alined bearings 7 offset horizontally from the casing axis.

A horizontal supporting plate 8 is mounted across the casing 1 between the bearings 6 and 7 and may well be secured to appropriate brackets 9. This supporting plate is provided with a central bearing 10 axially alined with the bearing 5 and it also preferably carries a pair of upstanding bearings 11 alined with the bearing 6, said bearings 11 and 6 receiving a horizontal drive shaft 12 upon which I have shown a hand-crank 13. Secured upon the shaft 12 is a bevel gear 14 and a spur gear 15 for purposes to be described below. The member 16 shown upon the shaft is merely a collar to prevent outward movement of said shaft by coming in contact with one of the bearings 11.

A short vertical shaft 17 is rotatably mounted in the bearing 10 and is provided at its upper end with a beveled driving gear 18 meshing with the gear 14, the lower end of said shaft being provided with an eccentric, here shown in the form of a wrist pin 19 carried by a disk 20 on the shaft. A lever-carrier, preferably in the form of a worm wheel 21, is rotatable upon the bearing 10 between the plate 8 and the disk 20 and in the construction shown, this wheel is provided with an integral depending fulcrum pin 22 upon which one end of a horizontal lever 23 is fulcrumed. In the preferred form of construction, this lever is formed with a longitudinal slot 24 slidably receiving a pair of wrist pin shoes 25 and 26, the shoe 25 being engaged with the wrist pin 19 while the shoe 26 is similarly engaged with another wrist pin 27 rising from a disk 28 on the upper end of a valve turning shaft 29 which is rotatable in the bearing 5, said shaft 29 being provided with an appropriate thrust-bearing 30 and a bit 31 of any desired form to engage with the slot or sockets in the valve.

The worm wheel 21 is slowly rotated while the wrist pin 19 is rotating rather rapidly and hence the lever 23 will be oscillated to oscillate the shaft 29 and at the same time will be carried bodily around with said wheel 21 to similarly turn the shaft 29 and produce the necessary slow advancement of the valve around its seat.

In the construction shown, for the purpose of driving the wheel 21, I have illustrated a worm 32 on a horizontal shaft 33 which is rotatable in the bearing 7, said shaft 33 being driven from the gear 15 by a suitable train of gears 34.

The operation of the several parts will probably be clear from the foregoing, but may be briefly explained as follows:—Rotation of the shaft 12 by the crank 13 or by power if desired, causes the gears 14 and 18 to rotate the vertical shaft 17, thus causing the wrist pin 19 to oscillate the lever 23 upon the fulcrum pin 22, and transmitting oscillatory movement to the shaft 29 through the shoe 26, wrist pin 27 and disk 28. At the same time, the gearing 15—34, drives the shaft 33 and worm 32, causing the latter to slowly turn the lever-carrying worm wheel 21, causing the lever 23 to be moved around a circular course as it is oscillating, thus slowly turning the shaft 29 in the desired manner.

Due to the arrangement of parts provided, although the oscillation of the valve is rapid, its reversal from movement in one direction to return movement in the opposite direction is so gradual that there is no danger whatever of the bit 31 being kicked from engagement with the valve slot or sockets. Similarly, operation of the entire machine is exceptionally smooth as there are no unbalanced and heavy parts positioned off-center and oscillated, as in some types of machines. Thus, there is no tendency to oscillate the casing instead of the valve-turning shaft.

Excellent results have been obtained from the details disclosed and they may be followed if desired, but the present disclosure is for illustrative purposes only and within the scope of the invention as claimed, minor changes may of course be made.

I claim:

1. A valve grinder comprising a rotatably mounted shaft, a rotatable eccentric and a rotatable carrier concentric with each other and in substantially axial alinement with said shaft, a lever fulcrumed to said carrier at a point spaced from its axis for movement transverse to such axis, said lever having operative engagement with said eccentric to receive oscillatory motion therefrom, a connection between said lever and said shaft at a point spaced laterally from the axis of the latter, and means for driving said carrier and said eccentric at relatively slow and fast speeds respectively.

2. A valve grinder comprising a rotatably mounted shaft, a rotatable eccentric and a rotatable carrier concentric with each other and in substantially axial alinement with said shaft, a lever fulcrumed to said carrier at a point spaced from its axis for movement transverse to such axis, said lever having a longitudinal guide in which said eccentric is received, a wrist pin carried by said shaft and extending into said guide, and means for driving said carrier and said eccentric at relatively slow and fast speeds respectively.

3. A valve grinder comprising a rotatably mounted shaft having a wrist pin, a second shaft axially alined with the aforesaid shaft and having a wrist pin offset a relatively short distance from its axis, a carrier rotatable about said second shaft and having a fulcrum pin in substantially transverse alinement with the aforesaid wrist pins, a lever between the two shafts fulcrumed on said fulcrum pin and slotted to receive both of said wrist pins, and means for driving said second shaft and said carrier at relatively fast and slow speeds.

4. A valve grinder comprising a casing having a central vertical bearing at its lower end, and a lateral bearing near its upper end, a horizontal support extending across the interior of said casing below said lateral bearing and having a vertical bearing alined with the aforesaid vertical bearing, a short vertical shaft rotatably mounted in the bearing of said support and having an eccentric on its lower end, a wheel rotatable about said shaft below said support but over said eccentric, said wheel having an offcenter fulcrum pin, a horizontal drive shaft extending into the casing through said lateral bearing and having a driving connection with said vertical shaft, means for slowly driving said wheel from said drive shaft, a valve turning shaft rotatably mounted in said first named vertical bearing and having a wrist pin on its upper end, and a lever fulcrumed on the aforesaid fulcrum pin and having operative connection with said eccentric and said wrist pin.

In testimony whereof I have hereunto affixed my signature.

WILLIAM H. GREENFIELD.